(12) United States Patent
Lim

(10) Patent No.: US 10,400,439 B2
(45) Date of Patent: Sep. 3, 2019

(54) TRANSFORMABLE HOUSE

(71) Applicant: Chun Man Lim, Eum Sung (KR)

(72) Inventor: Chun Man Lim, Eum Sung (KR)

(\*) Notice: Subject to any disclaimer, the term of this patent is extended or adjusted under 35 U.S.C. 154(b) by 0 days.

(21) Appl. No.: 15/956,947

(22) Filed: Apr. 19, 2018

(65) Prior Publication Data

US 2018/0238044 A1 Aug. 23, 2018

Related U.S. Application Data

(63) Continuation-in-part of application No. PCT/KR2016/000441, filed on Jan. 15, 2016.

(30) Foreign Application Priority Data

Oct. 20, 2015 (KR) .................... 10-2015-0145999

(51) Int. Cl.
*E04B 1/343* (2006.01)
*E04H 1/02* (2006.01)
(Continued)

(52) U.S. Cl.
CPC .......... *E04B 1/3431* (2013.01); *E04B 1/3483* (2013.01); *E04B 1/34336* (2013.01);
(Continued)

(58) Field of Classification Search
CPC .. E04B 1/3431; E04B 1/3483; E04B 1/34336; E04B 1/34815;
(Continued)

(56) References Cited

U.S. PATENT DOCUMENTS 4,103,462 A \* 8/1978 Freller ............... B60P 3/34
52/67
4,133,571 A \* 1/1979 Fillios ............... B60P 3/34
296/165
(Continued)

FOREIGN PATENT DOCUMENTS

KR 20-0234529 9/2001
KR 10-0905492 7/2009
(Continued)

OTHER PUBLICATIONS

English Specification of 10-1140300.
(Continued)

*Primary Examiner* — Joshua K Ihezie
(74) *Attorney, Agent, or Firm* — Antonio Ha & U.S. Patent, LLC

(57) ABSTRACT

A transformable house comprises a stationary part and a movable part placed inside the stationary part and configured to move out of the stationary part along a first direction of the movable part by a first distance. The movable part includes a first sub section having a first width equal to the first distance and a second sub section having a second width that is the rest of a width of the movable part, the second sub section including a water tank. The first width and the second width are determined to meet the following equation: $W1 \times D1 = W2 \times D2$, wherein W1, W2, D1, and D2 are the weight of the first sub section, the weight of the second sub section, the first width, and the second width, respectively.

2 Claims, 7 Drawing Sheets

(51) Int. Cl.
*E04B 1/348* (2006.01)
*E04H 1/04* (2006.01)
*F24S 20/60* (2018.01)

(52) U.S. Cl.
CPC ........... *E04B 1/34815* (2013.01); *E04H 1/02* (2013.01); *E04B 2001/34876* (2013.01); *E04B 2001/34892* (2013.01); *E04H 1/04* (2013.01); *F24S 20/60* (2018.05)

(58) Field of Classification Search
CPC . E04B 2001/34876; E04B 2001/34892; E04H 1/02; E04H 1/04; F24S 20/60; E03C 1/00
USPC .......... 52/64, 79.1, 79.5; 296/175, 171, 165, 296/26.05, 26.09, 172
See application file for complete search history.

(56) References Cited

U.S. PATENT DOCUMENTS

| | | | | |
|---|---|---|---|---|
| 4,295,679 | A * | 10/1981 | Artweger | B60P 3/34 296/171 |
| 5,050,927 | A * | 9/1991 | Montanari | B60P 3/32 296/165 |
| 5,398,986 | A * | 3/1995 | Koob | B60P 3/14 296/24.38 |
| 5,639,139 | A * | 6/1997 | Rush | B60P 3/025 280/763.1 |
| 5,787,650 | A * | 8/1998 | Miller | B60P 3/34 296/165 |
| 5,894,698 | A * | 4/1999 | Dewald, Jr. | E04B 1/3431 296/171 |
| 6,108,983 | A * | 8/2000 | Dewald, Jr. | B60P 3/34 296/171 |
| 6,182,401 | B1 * | 2/2001 | McManus | B60P 3/34 296/26.09 |
| 6,257,638 | B1 * | 7/2001 | Graber | B60P 3/34 296/26.01 |
| 6,470,630 | B1 | 10/2002 | Miyamoto | |
| 6,561,570 | B2 * | 5/2003 | Gehman | B60P 3/34 296/171 |
| 6,572,170 | B2 * | 6/2003 | McManus | B60P 3/34 296/26.13 |
| 6,976,721 | B2 * | 12/2005 | Rasmussen | B60P 3/34 296/165 |
| 6,981,728 | B2 * | 1/2006 | Rasmussen | B60P 3/34 296/165 |
| 7,540,549 | B2 * | 6/2009 | Revelino | B60P 3/34 296/26.01 |
| 8,091,940 | B1 * | 1/2012 | Buls | B60P 3/34 296/165 |
| 8,966,828 | B1 * | 3/2015 | Garcia | E04B 1/343 52/64 |
| 9,738,210 | B1 * | 8/2017 | Garceau | B60P 3/34 |
| 2002/0074816 | A1 * | 6/2002 | McManus | B60P 3/34 296/26.13 |
| 2002/0171255 | A1 * | 11/2002 | Eichhorn | B60P 3/34 296/26.01 |
| 2003/0213185 | A1 * | 11/2003 | Findley | B60G 3/00 52/67 |
| 2004/0174031 | A1 * | 9/2004 | Rasmussen | B60P 3/34 296/26.01 |
| 2005/0055891 | A1 * | 3/2005 | Kuebler | E04B 1/3431 52/79.1 |
| 2005/0072062 | A1 * | 4/2005 | Aust | E04B 1/34305 52/79.1 |
| 2006/0101727 | A1 * | 5/2006 | Holgerson | A62C 99/0081 52/79.1 |
| 2007/0028529 | A1 * | 2/2007 | Carter | E04B 1/34336 52/64 |
| 2012/0151851 | A1 * | 6/2012 | Cantin | E04B 1/34305 52/79.5 |
| 2013/0305625 | A1 * | 11/2013 | Pike | E04B 1/34305 52/64 |
| 2014/0000183 | A1 * | 1/2014 | Perren | E04H 1/005 52/79.5 |
| 2014/0360105 | A1 * | 12/2014 | Trout | E04B 1/34305 52/79.5 |

FOREIGN PATENT DOCUMENTS

| | | |
|---|---|---|
| KR | 10-1140300 | 5/2012 |
| KR | 10-1526913 | 6/2015 |

OTHER PUBLICATIONS

English Specification of 10-0905492.
English Specification of 20-0234529.
English Specification of 10-1526913.

* cited by examiner

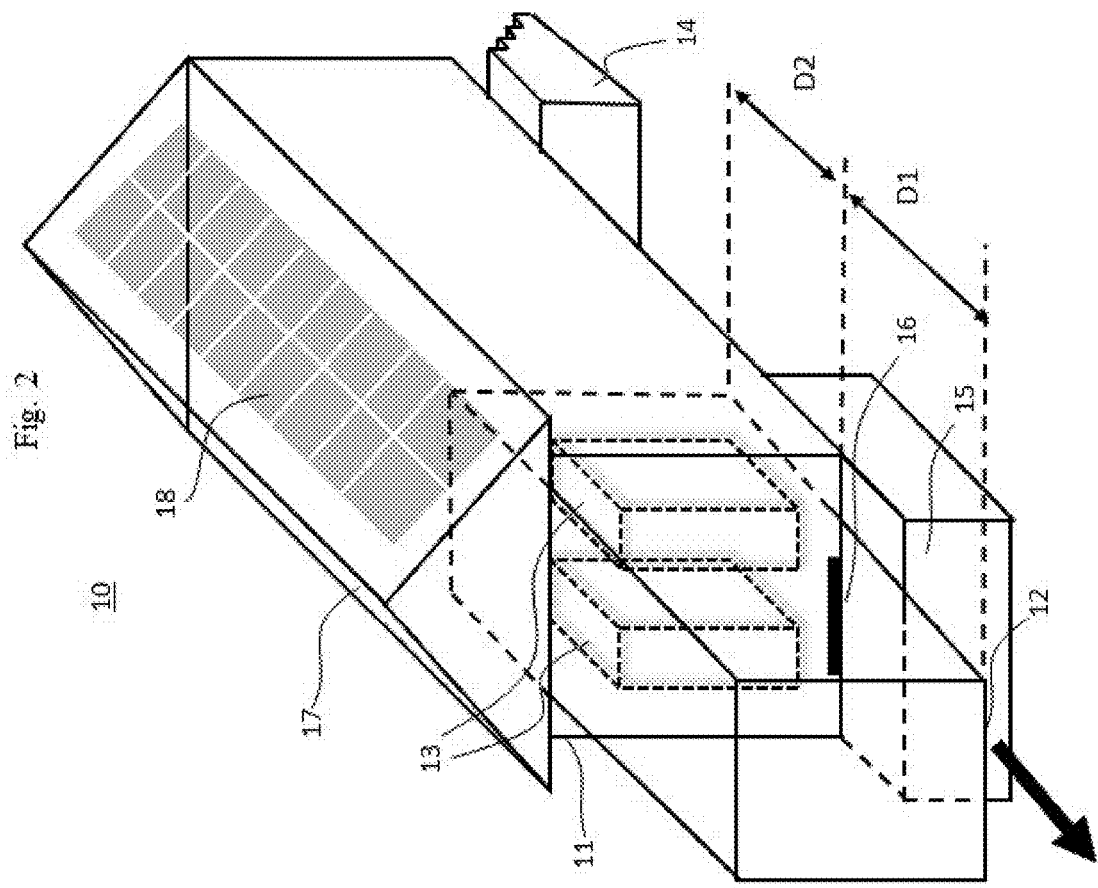

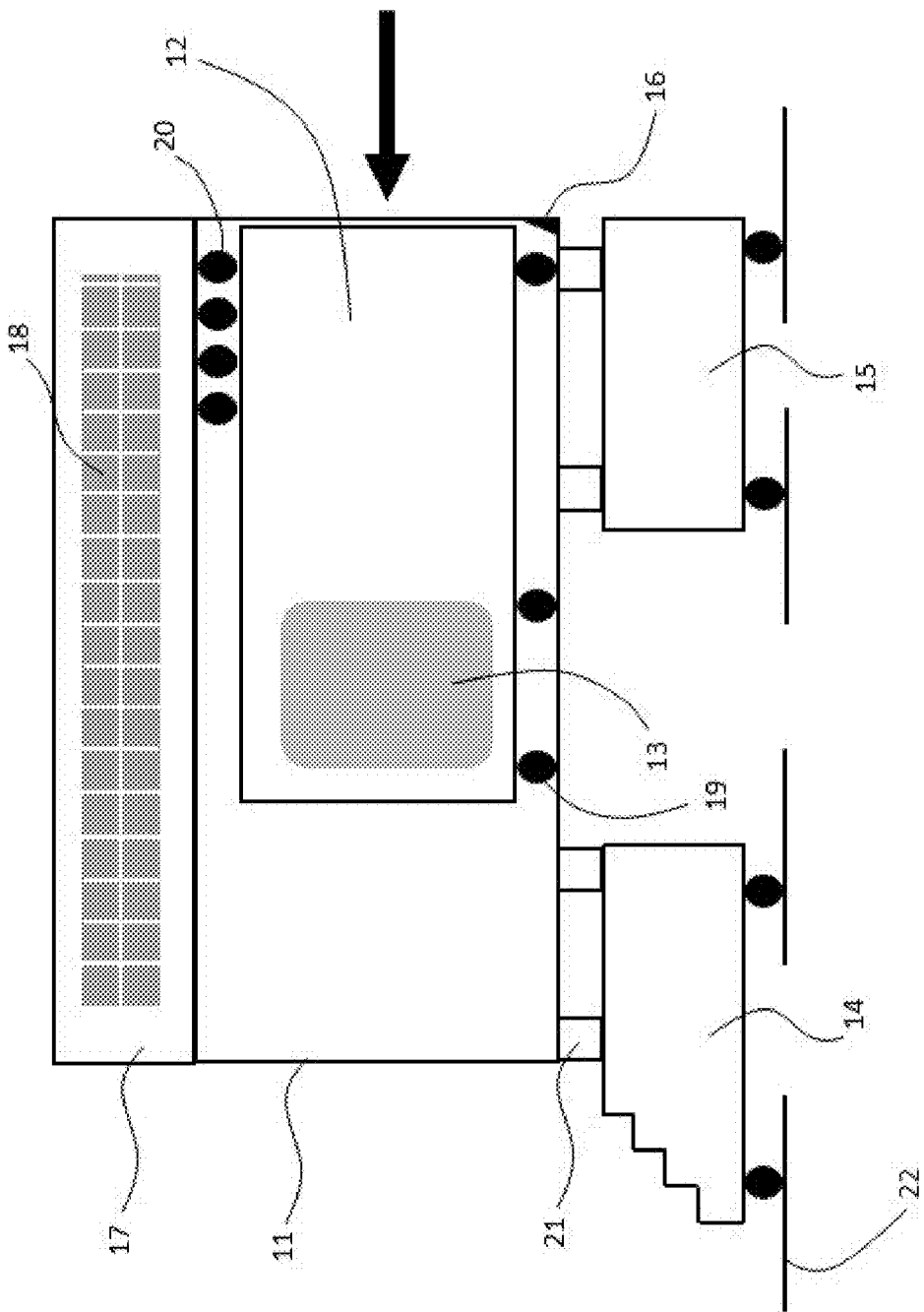

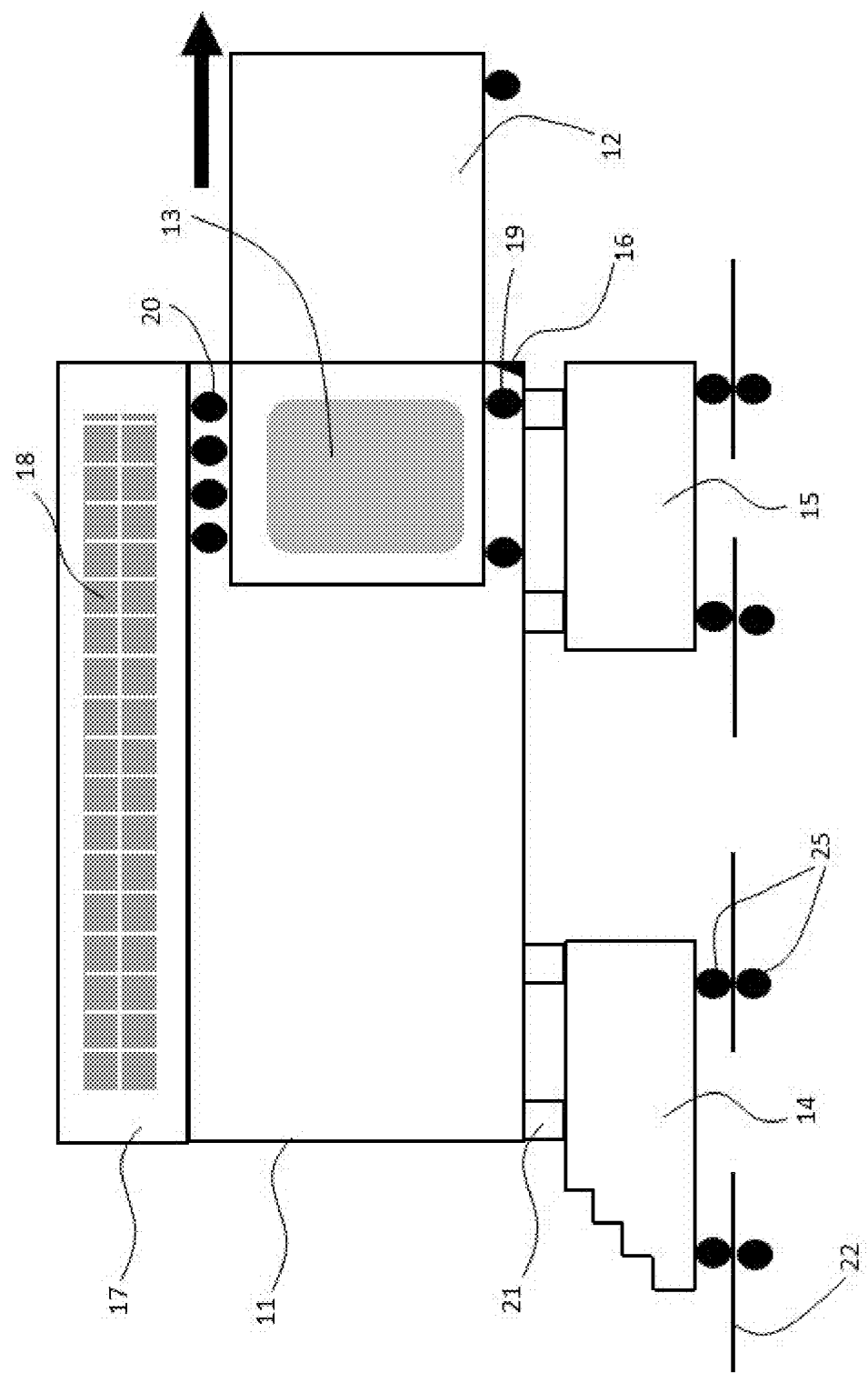

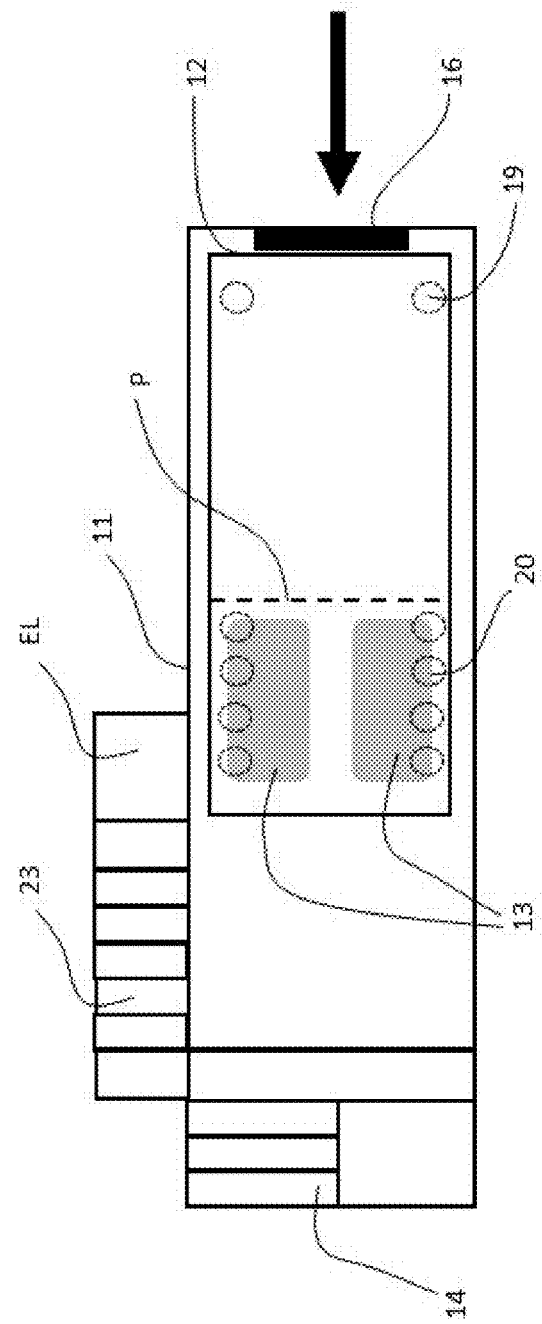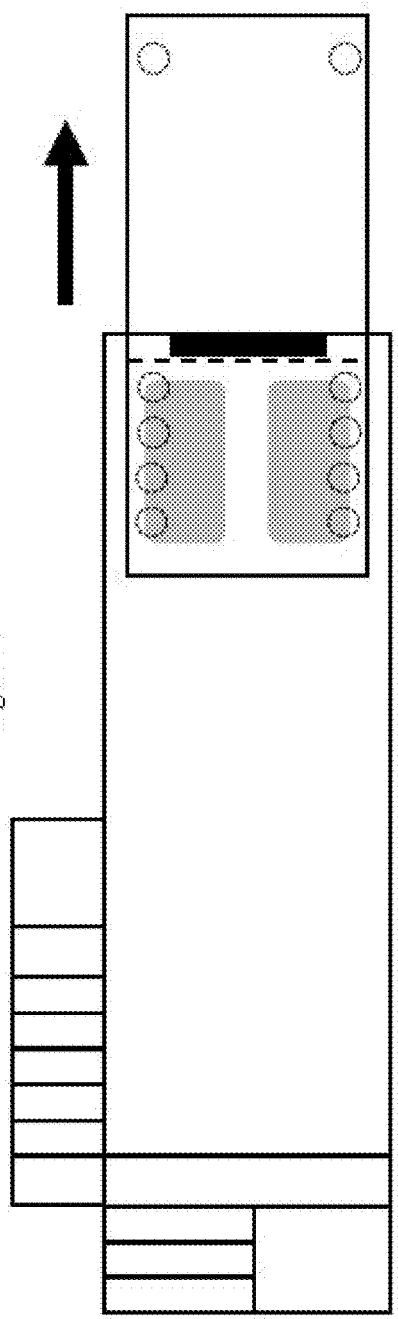

TRANSFORMABLE HOUSE

CROSS-REFERENCE TO RELATED APPLICATIONS

This patent application is a continuation-in-part application of International Patent Application No. PCT/KR2016/000441, filed on Jan. 15, 2016, which claims priority under 35 U.S.C. § 119 to Korean Patent Application No. 10-2015-0145999, filed on Oct. 20, 2015, in the Korean Intellectual Property Office, the disclosure of which is incorporated by reference herein in its entirety.

TECHNICAL FIELD

Various embodiments of the present disclosure concern movable or transformable houses, and more specifically, to a type of transformable house capable of easier space expansion and a multi-story building using the same.

DISCUSSION OF RELATED ART

A portable, demountable or transportable building, is a building designed and built to be movable rather than permanently located. A common modern design is sometimes called a modular building, but portable buildings can be different in that they are more often used temporarily and taken away later. Portable buildings (e.g. yurts) have been used since prehistoric times. The most familiar modern type of portable buildings are designed so that one can be carried to or from site on a large lorry and slung on and off by a crane. Portable modular buildings have various uses. They are often seen, alone or in groups, as temporary site offices on building sites (where they are often stacked two high with metal stairs to reach the upper level. Other uses for these and other types of portable buildings are as guard shacks, in-plant offices, rural offices, on-site changing rooms, etc. Some portable buildings are very complex by joining units these forming large office blocks. These are often disguised as a normal building often with brick style cladding and a traditional pitched roof. Due to population increases in many areas, portable buildings are sometimes brought in to various sectors, e.g., to provide relief from overcrowding.

However, conventional portable homes or buildings have a fixed shape and space, and thus have many limitations in efficient use, failing to live up to customers' or users' diverse needs.

SUMMARY

According to an embodiment of the present disclosure, a transformable house comprises a stationary part and a movable part placed inside the stationary part and configured to move out of the stationary part along a first direction of the movable part by a first distance. The first distance may be determined to allow the movable part to be slid out of the stationary part while remaining parallel with a floor of the stationary part.

The movable part may include a first sub section having a first width equal to the first distance and a second sub section having a second width that is the rest of a width of the movable part. The second sub section may include a water tank. The first width and the second width may be determined to meet the following equation: $W1 \times D1 = W2 \times D2$, wherein $W1$, $W2$, $D1$, and $D2$ are the weight of the first sub section, the weight of the second sub section, the first width, and the second width, respectively.

According to an embodiment of the present disclosure, the stationary part may include a stopper on a bottom thereof to stop the movement of the movable part. The stopper may be formed in a position to allow the movable part to be stopped from moving when the movable part is moved out of the stationary part by the first distance.

According to an embodiment of the present disclosure, the movable part may include a plurality of first wheels. Alternatively, the first wheels may be formed of steel or other heavy-duty materials. The first wheels may be casters.

According to an embodiment of the present disclosure, the stationary part may include a plurality of second wheels affixed to a ceiling of the stationary part. Alternatively, the second wheels may be formed of steel or other heavy-duty materials. The second wheels may support the movable part thereabove, preventing the movable part from falling down when the movable part is in the position of partially being out of the stationary part.

According to an embodiment of the present disclosure, the transformable house may further comprise a first base part and a second base part placed under the stationary part. The first base part may be spaced apart from the second base part.

According to an embodiment of the present disclosure, the first base part may include a stairway.

According to an embodiment of the present disclosure, a multi-story building may comprise a plurality of transformable houses stacked one above another and a pipe. Each of the plurality of transformable houses may include a stationary part and a movable part placed inside the stationary part and configured to move out of the stationary part along a first direction of the movable part by a first distance. The movable part may include a first sub section having a first width equal to the first distance and a second sub section having a second width that is the rest of a width of the movable part. The second sub section may include a water tank. The first width and the second width may be determined to meet the following equation: $W1 \times D1 = W2 \times D2$, wherein $W1$, $W2$, $D1$, and $D2$ are the weight of the first sub section, the weight of the second sub section, the first width, and the second width, respectively.

The pipe may vertically passe through respective sides of the plurality of transformable houses.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 2 is a perspective view illustrating a transformable house including a stationary part and a movable part, where the movable part slides out of the stationary part, according to an embodiment of the present disclosure;

FIG. 3 is a side view illustrating a transformable house including a stationary part and a movable part, where the movable part slides in the stationary part, according to an embodiment of the present disclosure;

FIG. 4 is a side view illustrating a transformable house including a stationary part and a movable part, where the movable part slides out the stationary part, according to an embodiment of the present disclosure;

FIG. 5A is a plan view illustrating a transformable house including a stationary part and a movable part, where the movable part slides in the stationary part, according to an embodiment of the present disclosure;

FIG. 5B is a plan view illustrating a transformable house including a stationary part and a movable part, where the movable part slides out the stationary part, according to an embodiment of the present disclosure;

DETAILED DESCRIPTION OF EXEMPLARY EMBODIMENTS

Hereinafter, exemplary embodiments of the disclosure will be described in detail with reference to the accompanying drawings. The same reference denotations may be used to refer to the same or similar elements throughout the specification and the drawings. The disclosure, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
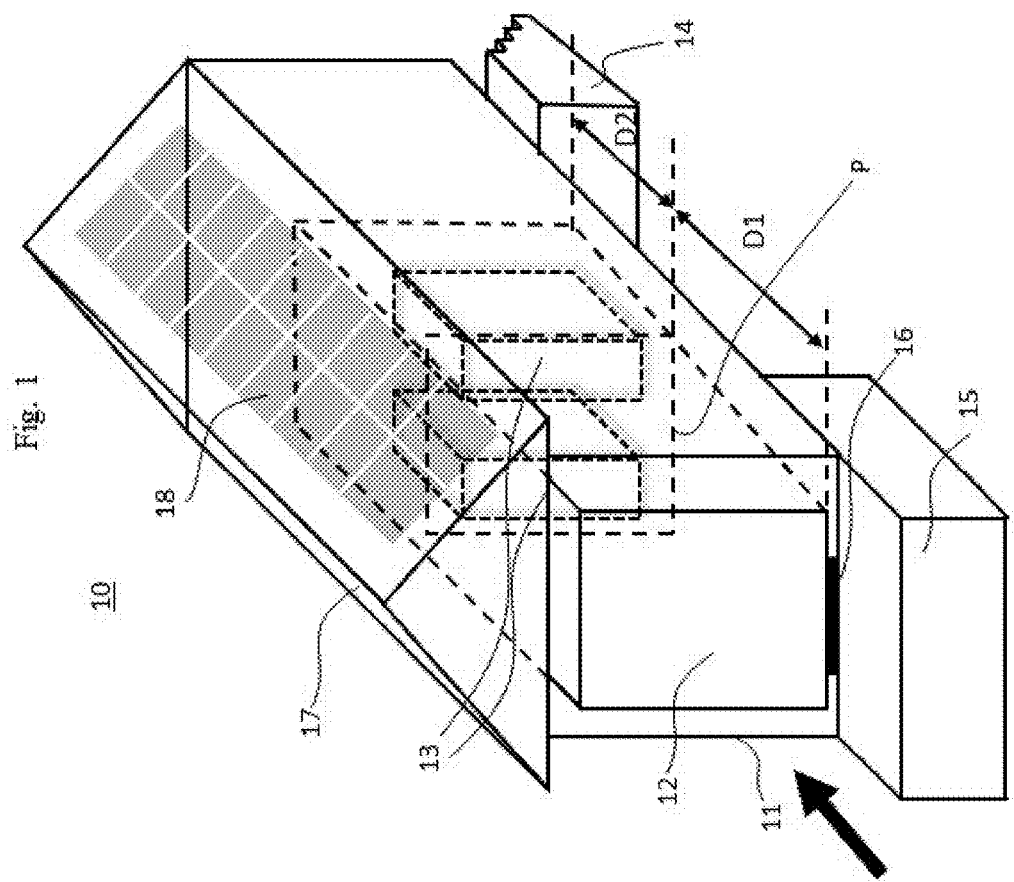
FIG. 1 is a perspective view illustrating a transformable house including a stationary part and a movable part, where the movable part slides in the stationary part, according to an embodiment of the present disclosure.

FIG. 1 is a perspective view illustrating a transformable house including a stationary part and a movable part, where the movable part slides in the stationary part, according to an embodiment of the present disclosure. FIG. 2 is a perspective view illustrating a transformable house including a stationary part and a movable part, where the movable part slides out of the stationary part, according to an embodiment of the present disclosure. FIG. 3 is a side view illustrating a transformable house including a stationary part and a movable part, where the movable part slides in the stationary part, according to an embodiment of the present disclosure. FIG. 4 is a side view illustrating a transformable house including a stationary part and a movable part, where the movable part slides out the stationary part, according to an embodiment of the present disclosure. FIG. 5A is a plan view illustrating a transformable house including a stationary part and a movable part, where the movable part slides in the stationary part, according to an embodiment of the present disclosure. FIG. 5B is a plan view illustrating a transformable house including a stationary part and a movable part, where the movable part slides out the stationary part, according to an embodiment of the present disclosure.

Referring to FIGS. 1 to 5, a transformable house 10 includes a stationary part 11 and a movable part 12. The stationary part 11 may be shaped substantially as an empty rectangular box. For example, the stationary part 11 may be an empty container or container house. However, the shape of the stationary part 11 is not limited thereto. The stationary part 11 may be larger in size than the movable part 12. The stationary part 11 may include a front opening through which the movable part 12 may move in or out of the inside of the stationary part 11. The stationary part 11 may be configured to cover and surround the movable part 12, e.g., when the movable part 12 is placed inside the stationary part 11.

The stationary part 11 may be formed of a metal, e.g., steel or aluminum or other various types of metals. For example, the stationary part 11 may include a container consisting of six steel panels, e.g., a front panel, a rear panel, a top panel, a bottom panel, a right-hand panel, and a left-hand panel. However, without being limited thereto, the stationary part 11 may be formed of other various materials, such as plastic, e.g., reinforced plastic.

The stationary part 11 may include a roof 17 on the top, overall forming an outer appearance such as that of a normal house. Solar cell panels 18 may be placed on the roof 17 of the stationary part 11 to supply power for use in the transformable house 10.

The movable part 12 may be placed inside the stationary part 11 and configured to move in or out of the stationary part 11 along a first direction of the movable part 12 by a first distance.

The first distance may be determined to allow the movable part 12 to be slid out of the stationary part 11 while remaining parallel with a floor of the stationary part 11 or the ground G.

For example, the movable part 12 may be formed to be smaller in size than the stationary part 11 to be received inside the stationary part 11. The movable part 12 may be shaped substantially as an empty rectangular box. For example, the movable part 12 may be an empty container or container house. However, the shape of the movable part 12 is not limited thereto.

The movable part 12 may be formed of a metal, e.g., steel or aluminum or other various types of metals. For example, the mobile part may include a container consisting of six steel panels, e.g., a front panel, a rear panel, a top panel, a bottom panel, a right-hand panel, and a left-hand panel. However, without being limited thereto, the movable part 12 may be formed of other various materials, such as plastic, e.g., reinforced plastic.

The movable part 12 may include a water tank 13 inside. The water tank 13 may be positioned to a side, e.g., in a corner inside the movable part 12. According to an embodiment of the present disclosure, a pair of water tanks 13 may be placed on the floor of the movable part 12 on or near an inner side wall of the movable part 12. The two water tanks 13 may be spaced apart from each other in their respect corresponding corners inside the movable part 12. The water tank(s) 13 may be intended for household use, e.g., drinking, washing dishes, or taking shower. A plurality of through-holes may be formed in the roof 17 of the stationary part 11, and piping may be installed inside the roof 17, so that rain coming through the through-holes may be flowed through the piping and stored in the water tank(s) 13. The through-holes may be connected to the piping inside the roof 17 and be sealed off to allow water to flow through the piping without water leakage to anywhere else.

Alternatively, instead of the through-holes, a gutter may be installed around the roof 17 to collect and carry away rainfall from the roof 17 to the water tank(s) 13 in the second sub section or to the outside.

The movable part 12 includes a first sub section and a second sub section. For example, the first sub section may be intended for an ordinary life space. Various home goods, such as a bed, vanity tables, chairs, other various pieces of furniture, may be put in the first sub section. For example, the first sub section may also be used as a terrace. The second sub section may be intended for a space to put one or more water tanks 13 described below.

According to an embodiment of the present disclosure, the first sub section and the second sub section may be divided or partitioned by a partitioning wall P. An opening (not shown) and a door (not shown) may be installed in the partitioning wall for the user's entry or exit between the first sub section and the second sub section.

The first sub section of the movable part 12 may have a first width, and the second sub section of the movable part 12 may have a second width. The total width of the movable part 12 may be the sum of the first width of the first sub section and the second width of the second sub section. The first width of the first sub section may be substantially equal to the first distance by which the movable part 12 moves out of the stationary part 11. The water tank 13, or a pair of tanks, may be placed in the second sub section. The first width of the first sub section and the second width of the second sub section may be determined to meet the following equation:

$W1 \times D1 = W2 \times D2$, wherein W1, W2, D1, and D2 are the weight of the first sub section, the weight of the second sub section, the first width, and the second width, respectively.

According to an embodiment of the present disclosure, the bottom area of the first sub section of the movable part 12 may be about 66.6% of the total bottom area of the movable part 12, and the bottom area of the second sub section of the movable part 12 may be about 33.3% of the total bottom area of the movable part 12.

The water tank(s) 13 in the second sub section may add a weight or force to the second sub section to allow the first sub section to be slid out of the stationary part 11 in parallel with the floor in a balanced manner without being wobbled or inclined. For example, the movable part 12 may be slid in and out of the second sub section in directions denoted with the arrows as shown in FIGS. 1 to 5B. Although not shown, the slide-in or out of the movable part 12 may be achieved manually or automatically by way of a machine.

For example, where various home goods, e.g., pieces of furniture, are placed in the first sub section, W1 may be the total weight of the first sub section including such home goods. W2 may be the total weight of the second sub section including the water tank 13 or water tanks 13.

A stopper 16 may be formed on the floor of the stationary part 11 near the front opening of the stationary part 11. The stopper 16 may stop the movable part 12, which is moving to the outside of the stationary part 11, from moving when the first sub section of the movable part 12 is positioned outside the stationary part 11 while the second sub section of the movable part 12 is still inside the stationary part 11. In other words, the movable part 12 may be stuck to the stopper 16 to be stopped from moving further right before the second sub section of the movable part 12 is about to move out.

For example, the stopper 16 may be formed in a position to allow the movable part 12 to be stopped from moving when the movable part 12 is moved out of the stationary part 11 by the first distance.

The movable part 12 includes a plurality of first wheels 19 affixed to the bottom of the movable part 12. The first wheels 19 may be arranged apart from each other at predetermined intervals along two opposite rows on the bottom of the movable part 12 to assist the movable part 12 in easily moving in or out of the stationary part 11. Alternatively, the first wheels 19 may be formed of steel or other heavy-duty materials. For example, the first wheels 19 may be casters.

The stationary part 11 may include a plurality of second wheels 20 affixed to the ceiling of the stationary part 11. The second wheels 20 may be arranged apart from each other at predetermined intervals along two opposite rows on the ceiling of the stationary part 11. The second wheels 20, along with the first wheels 19, may further assist the movable part 12 in easily slide in or out of the stationary part 11. Alternatively, the second wheels 20 may be formed of steel or other heavy-duty materials. For example, the second wheels 20 may be casters.

The second wheels 20 may support the movable part thereabove, preventing the movable part 12 from falling down when the movable part is in the position of partially being out of the stationary part. For example, when the first sub section of the movable part 12 is positioned outside the stationary part 11, the second wheels 20 may hold and support the second sub section of the movable part 12 in contact with the second sub section, preventing the first sub section of the movable part 12 from falling down due to the gravity.

Alternatively, the second wheels 20 may be provided on the top of the movable part 12, instead of the stationary part 11 in which case the second wheels 20, together with the first wheels 19, allow the movable part 12 to easily be slid in or out of the stationary part 11.

The first wheels 19 or the second wheels 20 may be casters, e.g., ball casters, but not limited thereto.

The transformable house 10 may further include a first base part 14 and a second base part 15 placed under the stationary part 11. The first base part 14 and the second base part 15 may be connected to the bottom of the transformable house 10, specifically, the second sub section of the transformable house 10, via various types of couplers 21. The couplers 21 may be arranged at, at least one or more of the edges of the top of the first base part 14 or the second base part 15. Anti-shock, or shock-absorbing materials, e.g., springs or rubber, may be arranged in their respective corners on the top of the first base part 14 or the second base part 15. The couplers 21 may also function as supports to back up the stationary part 11, or the couplers 21 may be replaced with supports. The first base part 14 is spaced apart from the second base part 15. The first base part 14 may include a stairway. The stationary part 11 may include a door in the rear panel. The user of the movable part 12 may step up the stairway of the first base part 14 and enter the stationary part 11 through the door. The second base part 15 may be formed of a rectangular box, e.g., a container, and may be used as a garage, a storage room, or for other various purposes.

Casters or rails may be formed on the bottoms of the first base part 14 and the second base part 15, so that the overall transformable house 10 may easily be moved. The first base part 14 may also be formed of an empty container for storage purposes.

Figure 6A:
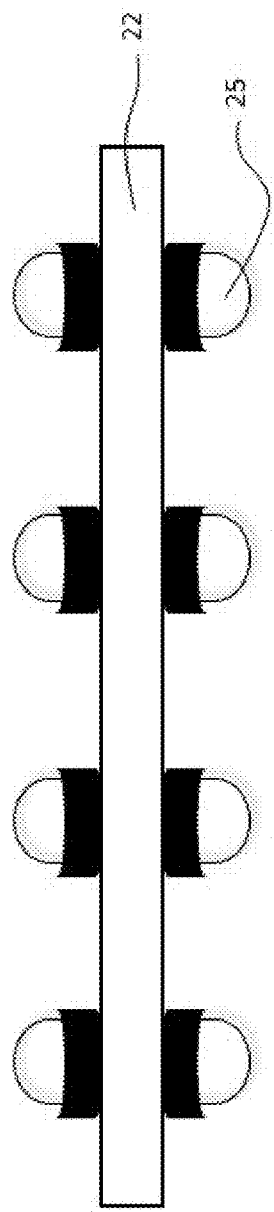
FIG. 6A is a side view illustrating a first steel plate or a second steel plate to be placed under a first base part or a second base part of a transformable house according to an embodiment of the present disclosure.
Figure 6B:
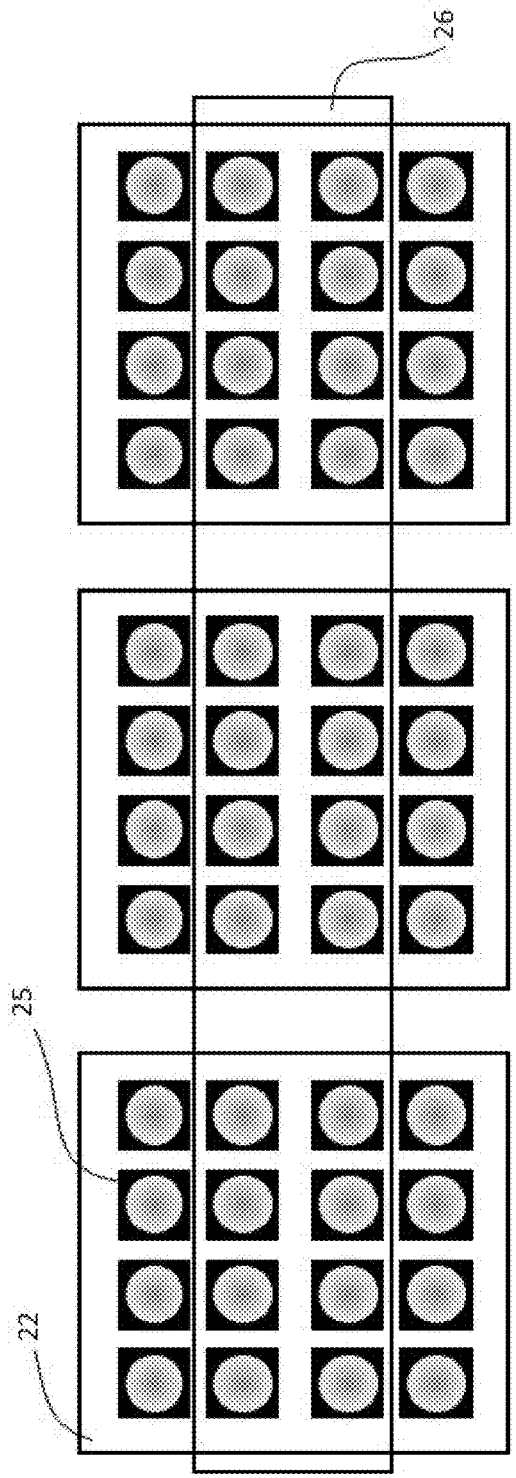
FIG. 6B is a plan view illustrating a first steel plate or a second steel plate to be placed under a first base part or a second base part of a transformable house according to an embodiment of the present disclosure.

FIG. 6A is a side view illustrating a first steel plate or a second steel plate to be placed under a first base part 14 or a second base part 15 of a transformable house 10 according to an embodiment of the present disclosure. FIG. 6B is a plan view illustrating a first steel plate or a second steel plate to be placed under a first base part 14 or a second base part 15 of a transformable house 10 according to an embodiment of the present disclosure.

Referring to FIGS. 6A and 6B, according to an embodiment of the present disclosure, a first steel plate 22 and a second steel plate 22 may be placed under the first base part 14 and the second base part 15, respectively. The first steel plate 22 may be substantially the same in shape or structure as the second steel plate 22, and thus, the first steel plate 22 and the second steel plate 22 may collectively be referred to as steel plates and be denoted with the same reference number 22. An array of a plurality of casters 25 (e.g., ball casters) may be formed on the top of each of the first steel plate 22 and the second steel plate 22. A beam structure 26 or steel beam of the first base part 14 or the second base part 15 may be seated on the plurality of casters 25. Another array of a plurality of casters 25 (e.g., ball casters) may be formed on the bottom of each of the first steel plate 22 and the second steel plate 22 and be seated on, or buried in, the ground G where the transformable house 10 is to be placed. Such structure of the steel plates 22 allows the transformable house 10 an anti-earthquake capability. Although the two steel plates 22 are shown and described herein for illustration purposes, the number of steel plates to be seated under the first base part 14 or the second base part 15 is not limited thereto. For example, more than two steel plates 22 may be put under the first base part 14 or the second base part 15. By use of such steel plates 22 with the ball casters on the top and bottom thereof, the transformable house or a multi-story building with multiple transformable houses stacked one over another may stably be positioned on the ground against various external impacts, e.g., earthquake.

Figure 7:
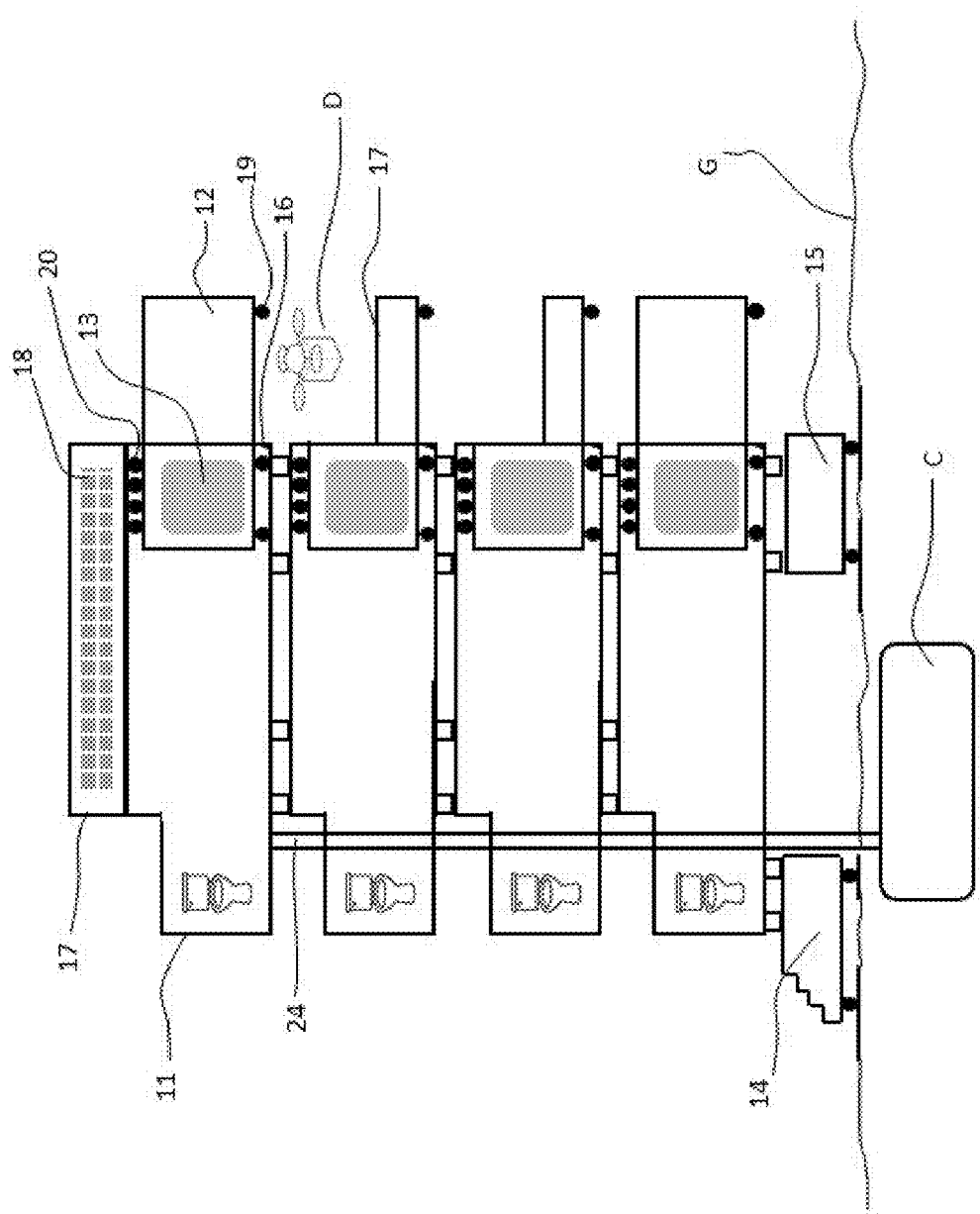
FIG. 7 is a side view illustrating an example of configuring a multi-story building using a plurality of transformable houses according to an embodiment of the present disclosure.

FIG. 7 is a side view illustrating an example of configuring a multi-story building using a plurality of transformable houses according to an embodiment of the present disclosure.

According to an embodiment of the present disclosure, a multi-story building 100 may include a plurality of transformable houses 10 and piping 24. Each of the plurality of transformable houses 10 may be configured as described above in connection with FIGS. 1 and 2.

The plurality of transformable houses 10 of the multi-story building 100 may be stacked one over another. The plurality of transformable houses 10 may be connected to each other via various types of couplers. The couplers may be formed of anti-shock, or shock-absorbing, materials, such as springs or rubber. The plurality of transformable houses 10 may be stacked with a gap left therebetween. Such an inter-transformable house gap allows a strong wind to naturally flow in and out therethrough without impacting hard the multi-story building 100, thus allowing the multi-story building 100 to stay stable.

Alternatively, the corners of the top or bottom of each transformable house 10 of the multi-story building 100 may be formed with protrusions or depressions so that each transformable house 10 fits its underneath transformable house 10 through their protrusions and depressions, also in which case, a gap may be left between the upper and lower transformable houses 10 for a smooth wind flow.

The piping 24 of the multi-story building 100 may pass through the respective sides of the plurality of transformable houses 10. The piping 24 of the multi-story building 100 may be connected to the respective inner pipes (not shown) of the transformable houses 10 for water supply or sewage purposes of each household in the transformable houses 10. The piping 24 may be connected to a cesspool C buried in the ground.

A first base part 14 and a second base part 15 may be placed under the multi-story building 100 to support the multi-story building 100. The first base part 14 may be spaced apart from the second base part 15. The first base part 14 may have a stairway. The respective stationary parts 11 of the transformable houses 10 each may include a door in the rear panel. Each transformable house 10 of the multi-story building 100 may also have its stairway that connects to the other transformable houses 10 so that the users of the transformable houses 10 may enter their transformable houses 10 along the stairways. The second base part 15 may be formed of a rectangular box, e.g., a container, and may be used as a garage, a storage room, or for other various household purposes.

A roof 17 or an attic may be formed on the top of the uppermost one of the plurality of transformable houses 10. Solar cell panels 18 may be installed on the roof 17 to feed power to all the households of the multi-story building 100. The stationary part 11 of each transformable house 10 in the multi-story building 100 may have an opening in the front panel to allow its corresponding movable part 12 to slide in or out therethrough and, e.g., a bathroom, in the rear as shown in FIG. 3.

For at least one of the transformable houses 10 in the multi-story building 100, the first sub section of the movable part 12 may be formed as a terrace or a space where, e.g., a drone D, may be landed for shipping ordered products.

Although not shown, an elevator EL or emergency stairs 23 may be formed on the side of the multi-story building 100.

As set forth above, the movable part 12 of the transformable house 10 may be easily slid in or out of the stationary part 11, manually or automatically machined powered. The movable part 12 may be slid out of the stationary part 11 only by the first distance, i.e., as long as the width of the first sub section of the movable part 12 and be stopped from further moving out by the stopper 16 while being balanced between the first sub section and the second sub section without the first sub section falling down or wobbled. Such a parallel and balanced slide-out of the movable part 12 may be achieved by the relationship in weight and width between the first sub section and the second sub section. In other words, as the relationship in weight and width between the first sub section and the second sub section of the movable part 12 meets the following equation: $W1 \times D1 = W2 \times D2$, wherein W1, W2, D1, and D2 are the weight of the first sub section, the weight of the second sub section, the first width, and the second width, respectively, the first sub section of the movable part 12 may be slid out of the stationary part 11 without being pushed down or wobbled.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A transformable house, comprising:
a stationary part;
a movable part placed inside the stationary part and configured to move out of the stationary part along a first direction of the movable part by a first distance;
a first base part including a stairway; and
a second base part placed under the stationary part, wherein the first base part is spaced apart from the second base part, wherein the first distance is determined to allow the movable part to be slid out of the stationary part while remaining parallel with a floor of the stationary part, wherein the movable part includes a first sub section having a first width equal to the first distance and a second sub section having a second width that is the rest of a width of the movable part, the second sub section including a water tank, wherein the first width and the second width are determined to meet the following equation:

$W1 \times D1 = W2 \times D2$, wherein W1, W2, D1, and D2 are the weight of the first sub section, the weight of the second sub section, the first width, and the second width, respectively, wherein the stationary part includes a stopper on a bottom thereof to stop the movement of the movable part, and wherein the stopper is formed in a position to allow the movable part to be stopped from moving when the movable part is moved out of the stationary part by the first distance, wherein the movable part includes a plurality of first wheels, and wherein the plurality of first wheels are arranged in a pair of rows on a bottom of the movable part, wherein the stationary part includes a plurality of second wheels affixed to a ceiling of the stationary part, and wherein the plurality of second wheels are arranged in a pair of rows in contact with a top of the movable part and are configured to support the first sub section of the movable part to be prevented from falling down.

2. A multi-story building comprising:
a plurality of transformable houses stacked one above another, each of the plurality of transformable houses including
a stationary part; and
a movable part placed inside the stationary part and configured to move out of the stationary part along a first direction of the movable part by a first distance, wherein the movable part includes a first sub section having a first width equal to the first distance and a second sub section having a second width that is the rest of a width of the movable part, the second sub section including a water tank, wherein the first width and the second width are determined to meet the following equation:
$W1 \times D1 = W2 \times D2$, wherein W1, W2, D1, and D2 are the weight of the first sub section, the weight of the second sub section, the first width, and the second width, respectively; and
piping vertically passing through respective sides of the plurality of transformable houses.

* * * * *